(12) United States Patent
Faber

(10) Patent No.: US 6,176,415 B1
(45) Date of Patent: Jan. 23, 2001

(54) METHOD AND DEVICE FOR CONNECTING COMPONENTS

(75) Inventor: Thomas Faber, Berlin (DE)

(73) Assignee: Untergrundspeicher-und Geotechnologie-Systeme GmbH, Mittenwalde (DE)

( * ) Notice: Under 35 U.S.C. 154(b), the term of this patent shall be extended for 0 days.

(21) Appl. No.: 09/308,055
(22) PCT Filed: Nov. 11, 1997
(86) PCT No.: PCT/DE97/02668
§ 371 Date: May 10, 1999
§ 102(e) Date: May 10, 1999
(87) PCT Pub. No.: WO98/21002
PCT Pub. Date: May 22, 1998

(30) Foreign Application Priority Data

Nov. 11, 1996 (DE) .............................................. 197 47 707

(51) Int. Cl.[7] .......................... B23K 20/12; B23K 31/02; B23K 31/00; B23K 5/22
(52) U.S. Cl. ........................ 228/112.1; 228/119; 228/212
(58) Field of Search ................. 228/112.1, 119, 228/212

(56) References Cited

U.S. PATENT DOCUMENTS

| | | | |
|---|---|---|---|
| 3,732,613 | * 5/1973 | Steigerwald | 29/470.3 |
| 3,753,820 | * 8/1973 | Ishikawa et al. | 156/73 |
| 3,874,067 | * 4/1975 | Toyooka et al. | 29/470.3 |
| 4,331,280 | * 5/1982 | Terabayashi et al. | 228/112 |
| 5,248,077 | * 9/1993 | Rhoades et al. | 228/112.1 |
| 5,551,623 | * 9/1996 | Collot et al. | 228/112.1 |

FOREIGN PATENT DOCUMENTS

356017197A * 2/1981 (JP).
358090388A * 5/1983 (JP).

* cited by examiner

Primary Examiner—Patrick Ryan
Assistant Examiner—Zidia T. Pittman
(74) Attorney, Agent, or Firm—Michael J. Striker

(57) ABSTRACT

Connector components, such as pipes, rods or semi-finished products is performed by friction welding with the steps of using a friction element which is arranged in an abutting position between those ends of the components which are to be connected and is rotated about an axis which is common to the components and to the friction element in order to produce a welding temperature by friction heat with compression forces which at the same time act on contact surfaces between the friction element and the component ends, subjecting the connecting component, for adjoining process, after the rotary movement has been stopped to higher compression forces in opposite directions, after reaching the welding temperature within a virtually steady-state temperature area, continuing the welding process with a material of the friction element being removed on surfaces which are involved with the friction process, until the ends of the components to be joined come into contact with one another, thereafter subjecting the components to an increased contact pressure and welding to one another by upsetting, and removing a friction and upsetting burr produced during the friction and upsetting, at the same time.

8 Claims, 4 Drawing Sheets

METHOD AND DEVICE FOR CONNECTING COMPONENTS

BACKGROUND OF THE INVENTION

The invention relates to a method and an apparatus for connecting components, such as pipes, rods and similar semi-finished products, by friction welding, in particular for connecting pipes while drilling deep holes and/or for completing holes, for example cavern holes.

DE-A 20 20 121 discloses a method for connecting vertically aligned pipe sections, in which at least one end of the pipe sections to be connected is provided with a chamfer, which acts as a welding joint. A plurality of weld layers are introduced, with the aid of a welding apparatus, into the welding joint formed in this way, in order to connect the components to one another. The welding apparatus comprises a bracket which is mounted on one of the pipe sections to be connected, coaxially with respect to their common longitudinal axis, and a welding head which can be moved on a circular path along the outer casing of the pipe sections to be connected in order to introduce a weld metal into the welding joint, supported and held on the bracket. The welding head is furthermore equipped with means in order to move its horizontal position radially with respect to the external diameter of the pipe sections to be connected.

The solution according to DE-A 20 20 121, which, subject to certain preconditions, appears to be usable on site for the production of pipe systems in deep holes, is very complex from the installation point of view and with respect to the envisaged method technology since a weld filler which can be liquefied must always be used for securely connecting the pipe sections, and a number of weld layers must be incorporated into the welding joint. Furthermore, the setting up and alignment of the welding apparatus involves a further time penalty.

A so-called radial friction welding method, which is improved in comparison with the solution mentioned above, for connecting tubing and casing pipes is disclosed in GB Patent Application 8910118.2.

SUMMARY OF THE INVENTION

Accordingly, it is an object of present invention to provide a method of and an apparatus for connecting components of the above mentioned general type, which avoids the disadvantages of the prior art. The friction heat produced in this way results in the materials of the components involved in the joining process being changed to a plasticized state which can be welded, and a friction-welded connection is produced between the friction ring and the end sections of the pipes to be connected, with the welding ring virtually being rolled into the pipe ends in the region of the connecting point, and producing a cohesive joint.

Welding rings which have to be manufactured specially and are matched accurately to the respective geometric dimensions and materials of the pipes to be connected are required to carry out this radial friction welding method since, once the welding process has been completed, the welding ring is a part of the connection that has been produced, both in terms of the material and geometrically.

Depending on the initial geometry of the welding ring and the specific process sequence, the fact that the welding ring remains as part of the connection can lead to the external diameter in the region of the connecting point being enlarged, corresponding to the level of the welding ring, and with the enlargement being solid, in contrast to the welding and upsetting burr.

If a predetermined external diameter needs to be ensured, this solid diameter enlargement leads to more complex technological measures to remove it than those required to remove the welding and upsetting burr. Furthermore, as a result of the matching of the welding ring to the respective geometrical dimensions of the pipes to be connected, major mechanical efforts are required for reliably clamping and moving the welding ring.

A method and an apparatus for butt-welding of horizontally aligned pipes or the like by heating the contact surfaces to the welding temperature by means of friction heat produced by relative rotation of the contact surfaces with a compression force in the opposite direction active at the same time is already the subject matter of DE-A 23 29 080.

The welding temperature required for the cohesive joint is produced with the aid of a driven metal ring of an appropriate size and thickness which is inserted in abutting contact between the pipes to be connected. Once the welding temperature has been reached, the rotation of the ring is stopped, and a closing compression force is applied between the pipes to produce the welded joint between them and the inserted ring.

This method essentially has the same disadvantages as those described in more detail above. The friction ring which is inserted and driven in order to produce the welding temperature by means of friction heat must be matched to the size and the wall thickness of the pipes to be connected. Furthermore, two weld beads, instead of one, must be produced to connect two pipes. As a consequence, on the one hand, the monitoring of the parameters for the friction and upsetting pressure is required for quality assurance, and the friction and upsetting shortening for the two welding processes that take place at the same time, with separate evaluation, can be achieved only with great effort. On the other hand, this results in increased technological measures to remove the friction and upsetting burr.

Another disadvantage of the last-mentioned method is that the torque which has been transmitted to the friction ring to produce the friction heat must at least partially be dissipated in order to produce the welded connection, before the increased contact force can be applied in order to produce the welded connection.

Various process characteristics, such as the length shortening per unit time, the constancy of the friction moment over a period of time, etc, are normally required to change from the friction process to the welding process (upsetting) for the friction welding of connections as disclosed in DE-A 23 29 080. In addition to recording control variables, relatively complex measured-value processing is required, for example comparison with preset values that are subject to tolerances, are dependent on the joint cross section and material and are generally determined by trial welds before the start of production. All these necessary preliminary activities result in additional effort and costs.

These disadvantages mentioned above have, until now, prevented widespread use of the welding of pipe runs on a drilling tower, as a result of which it has so far not been possible to exploit the benefit of the advantages associated with the welding of pipe connections, such as the improvement in the annular space clearances, reduction in the complexity of pipe runs, flushing, disposal and the like.

SUMMARY OF THE INVENTION

The invention is based on the object of developing a method and apparatus for producing friction-welded connections on components, which can be carried out using process characteristics that can be recorded and determined easily, irrespective of the joint cross section and the materials involved in the friction and welding process.

In accordance with the present invention, this object is achieved by a method which has the steps of using a friction element which is arranged in an abutting position between those ends of the components which are to be connected and is rotated about an axis which is common to the components and to the friction element in order to produce a welding temperature by friction heat with compression forces which at the same time act on contact surfaces between the friction element and the component ends, subjecting the connecting component, for adjoining process, after the rotary movement has been stopped to higher compression forces in opposite directions, after reaching the welding temperature within a virtually steady-state temperature area, continuing the welding process with a material of the friction element being removed on surfaces which are Involved with the friction process, until the ends of the components to be joined come into contact with one another, thereafter subjecting the components to an increased contact pressure and welding to one another by upsetting, and removing a friction and upsetting burr produced during the friction and upsetting, at the same time.

The object is also achieved by an apparatus which has a friction element arrangeable in an abutting position between ends of the components which are to be connected and rotated about an axis which is common to the components and to the friction element, in order to produce a welding temperature by friction heat with compression forces which at the same time act on contact surfaces between the friction element and the ends of the components, means for subjecting the connecting components to higher compression forces in opposite directions after the rotary movement has been stopped for performing adjoining process, means for continuing the welding process after reaching the welding temperature within a virtually steady-state temperature area, with the material of the friction element being removed on the surfaces which are involved in the friction process until the ends of the components to be joined come into contact with one another, means for subjecting the components thereafter to an increased contact pressure to weld the components to one another by upsetting, and means for removing friction and upsetting burr produced during the friction and upsetting process, at the same time, the friction element being formed as a friction disk which is provided with the means for removing the friction and upsetting burr.

The welding temperature required for the welded connection of two components is applied in a manner known per se by friction heat, which is produced by rotating a friction element between the firmly clamped-in components to be joined, applying a uniform pressure between the end faces of the components and the friction element, with the length of the components and the thickness of the disk being reduced.

The invention, makes use of a simple friction disk and, after a virtually steady-state temperature area has been reached in the area of the connecting point, in which area the amount of heat supplied and that flowing away at the ends of the components to be joined are of approximately equal magnitude, the friction process is continued with a virtually constant friction moment and with a proportional reduction in the length of the components to be connected, until the friction disk material has been completely removed on the contact surfaces involved in the friction process and, immediately after the consumption of the friction disk, the compression forces in opposite directions, to which the components have been subjected, are increased, and a cohesive connection of the plasticized ends of the components to be connected is produced by upsetting.

The friction welding technology according to the invention allows the entire friction and welding process to be considerably simplified and to be carried out more economically, since there is no longer any need for the previously required determination of the control variables required for the process sequence, or the preset values, which are dependent on the joint cross section and the material and, until now, have generally been determined by trial welds before the start of production.

In comparison with the previously known methods and devices, the solution according to the invention allows components to be connected by friction welding, during which process the components which have been connected to one another have no filler materials in their joint zone, and have only a single connecting point.

The use of a friction element in the form of a friction disk, which is completely removed in the region of the contact surfaces during the friction process, means that exact matching of the friction element to the dimensions and the basic materials of the components to be connected is no longer absolutely essential.

In consequence, a friction disk which can be produced easily and economically can now be used to connect to one another components, for example pipes, with different component geometries in terms of diameter and wall thickness, within a wide dimension range, by means of friction welding methods. The use of a friction disk for different component geometries furthermore also leads to considerable savings in the mechanical efforts for clamping and the rotary drive for the friction element. The technical means for clamping and moving the friction element thus now limit only to a minor extent the joint cross sections that can be achieved by using the invention and their use when the components to be connected have external diameters and wall thicknesses that change frequently.

The friction disk may be provided with an annular groove which continuously reshapes the friction burr, which is produced during the friction process, along the walls of the components to be connected.

According to one advantageous embodiment, the friction disk has two opposite cutouts arranged radially, in which cutting tools, for example lathe tools, are arranged such that they can move in order to cut off the friction and upsetting burr during the friction process and after completion of the upsetting process, using and absorbing the rotation energy transferred to the friction disk.

According to the previously known friction-welding methods using a rotating friction element, the friction element must, as a rule, be braked to rest before application of the ram/upsetting pressure, in which case the braking time should not exceed 0.5 seconds, in order to prevent premature cooling down in the connecting region of the components to be joined. Depending on the mass of the rotating friction element or component, complex braking systems are required for this purpose, which are subject to severe wear. With the proposed solution according to the invention, it is possible to dispense with such braking devices for canceling out the relative movement between the parts to be joined and the friction element.

At the same time, the invention ensures that the burr that is produced in the friction and upsetting process affects the flow conditions of the materials during joining of the components to be connected only to a minor or insignificant extent, and is removed in a simple, economic manner. The previously required technological measures in order to remove the friction and upsetting burr, and depending on the required execution quality and the pipe external and/or internal diameters to be complied with, can thus be avoided.

BRIEF DESCRIPTION OF THE DRAWINGS

The invention will be explained in more detail in the following text with reference to an exemplary embodiment.

DESCRIPTION OF THE PREFERRED EMBODIMENT

Figure 2:
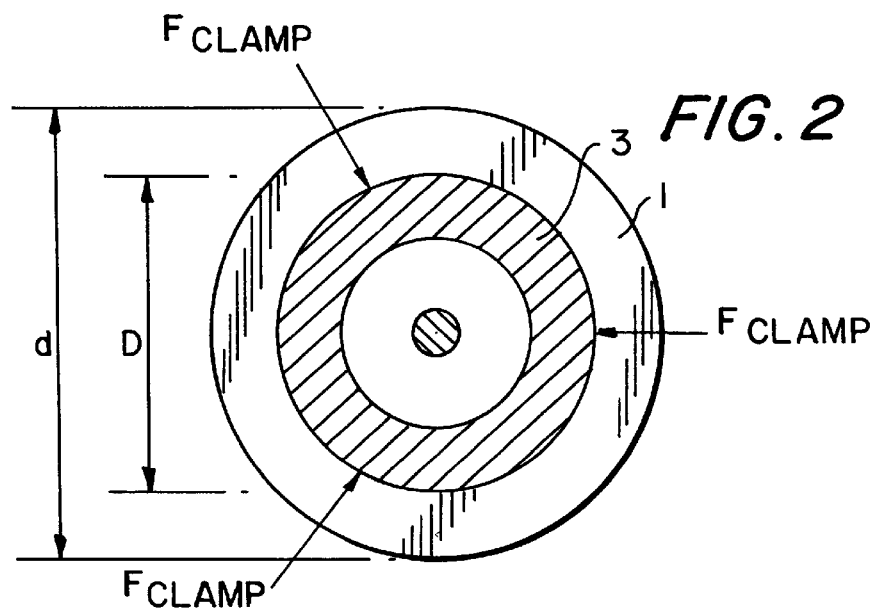
FIG. 2 shows the Section A—A from FIG. 1.
Figure 1:
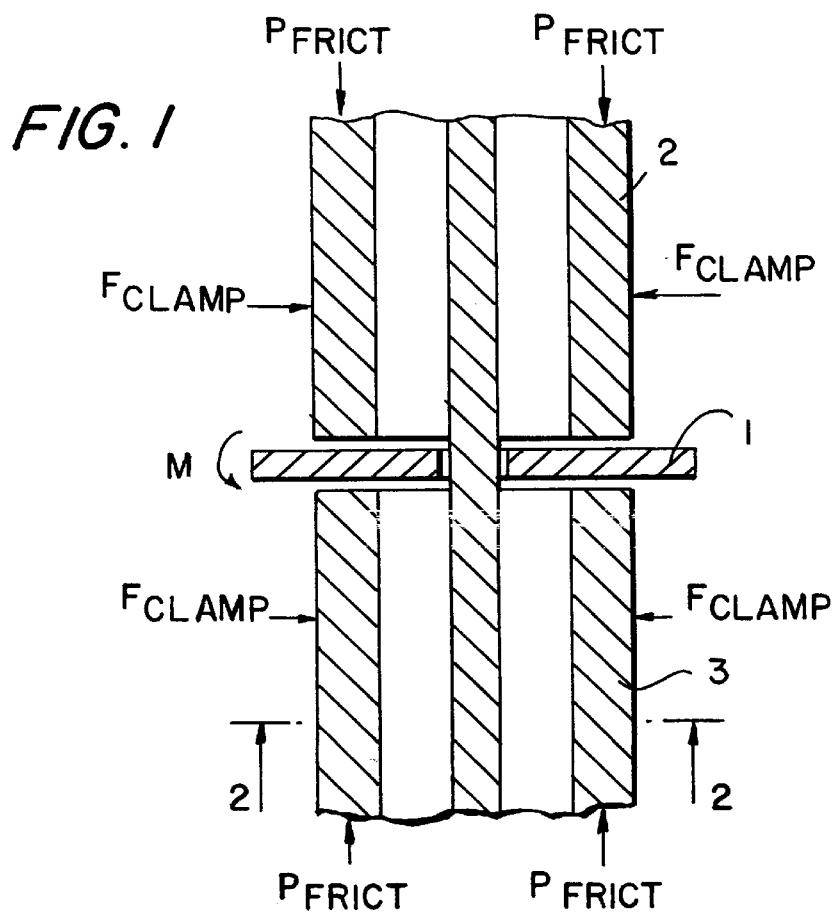
FIG. 1 shows a schematic illustration of the arrangement of the elements involved in the welding process, at the start of the friction-welding process.

As shown schematically in FIGS. 1 and 2, the components 2 and 3, for example pipes, which are to be connected to one another by friction welding are arranged such that they can move with respect to one another in the axial direction, and are secured against rotation by clamping forces $F_{Clamp}$. A friction disk 1 is arranged between the end faces of the components 2 and 3 and is driven by a drive unit—not shown—in order to produce the welding temperature by friction heat. The external diameter of the friction disk is advantageously chosen such that the joint diameter D and the drive diameter d do not depend on one another.

The possible joint cross section is thus not limited by the drive unit. Furthermore, mutually differing component geometries can be connected with one and the same friction disk size and a single set of mechanical equipment.

Figure 3:
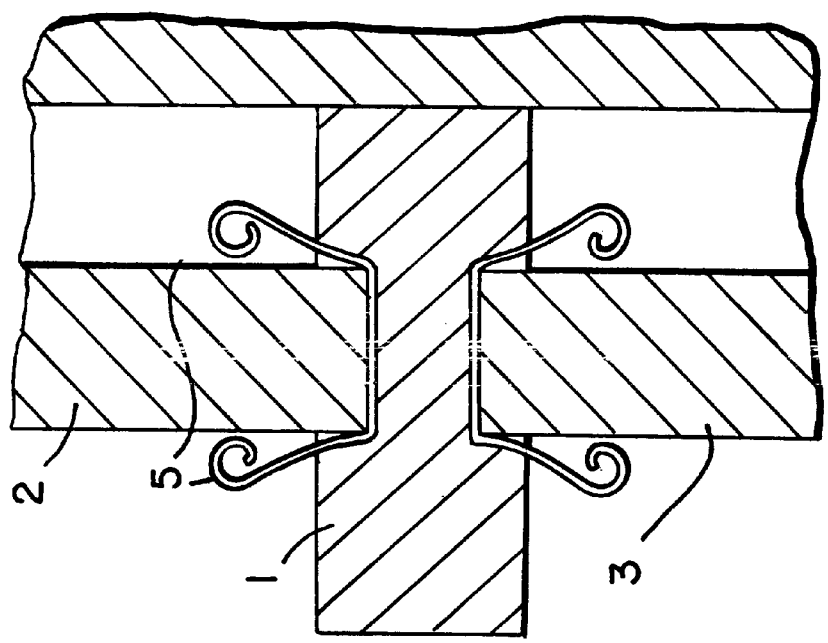
FIG. 3 shows the continuation of the welding process up to complete removal of the friction-disk material, once a virtually steady-state temperature area has been reached.

The amounts of heat required for the welding process are produced in a known manner by friction heat, in that a torque M is applied to the friction disk 1, and the drive unit is used to rotate it about a rotation axis which is common to the components 2 and 3 and the friction disk 1. With a uniform contact pressure $P_{Frict}$ between the end faces of the components 2 and 3 and the friction disk 1 and with the length of the components 2 and 3 being shortened while the thickness of the friction disk 1 is reduced, the friction process is continued until a virtually steady-state temperature area is achieved in the region of the ends of the components 2 and 3 to be connected—FIG. 3. Once this temperature area has been reached, the friction process is continued until the friction disk 1 has been completely consumed in the region of the contact surfaces between the friction disk 1 and the components 2 and 3. After completion of the friction process, that is to say once the friction disk 1 has been completely "rubbed away", the contact pressure $P_{Frict}$ is increased, and a cohesive connection is produced, by upsetting, of the ends of the components 2 and 3 which have been heated by friction heat and have been changed to a plasticized state.

This process is controlled by the process characteristics that change suddenly, such as the torque for the drive of the friction element, which changes as a result of the complete removal of the friction disk 1.

Figure 4:
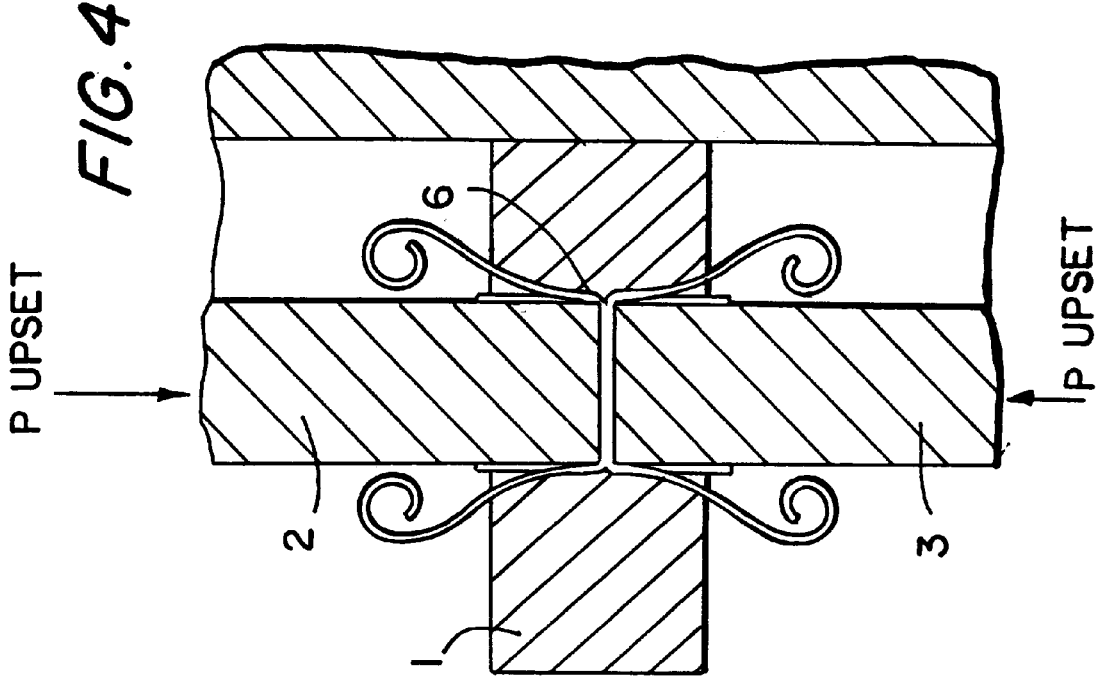
FIG. 4 shows the joining of the components to be welded, by upsetting with an increased contact pressure.

In the upsetting process, the elements of the material of the friction element 1 which remain in the connecting zone are forced out of the joint zone with the upsetting burr 5, so that the completed weld bead 6 is composed essentially of the basic materials of the components 2 and 3 to be connected—FIG. 4.

Figure 5:
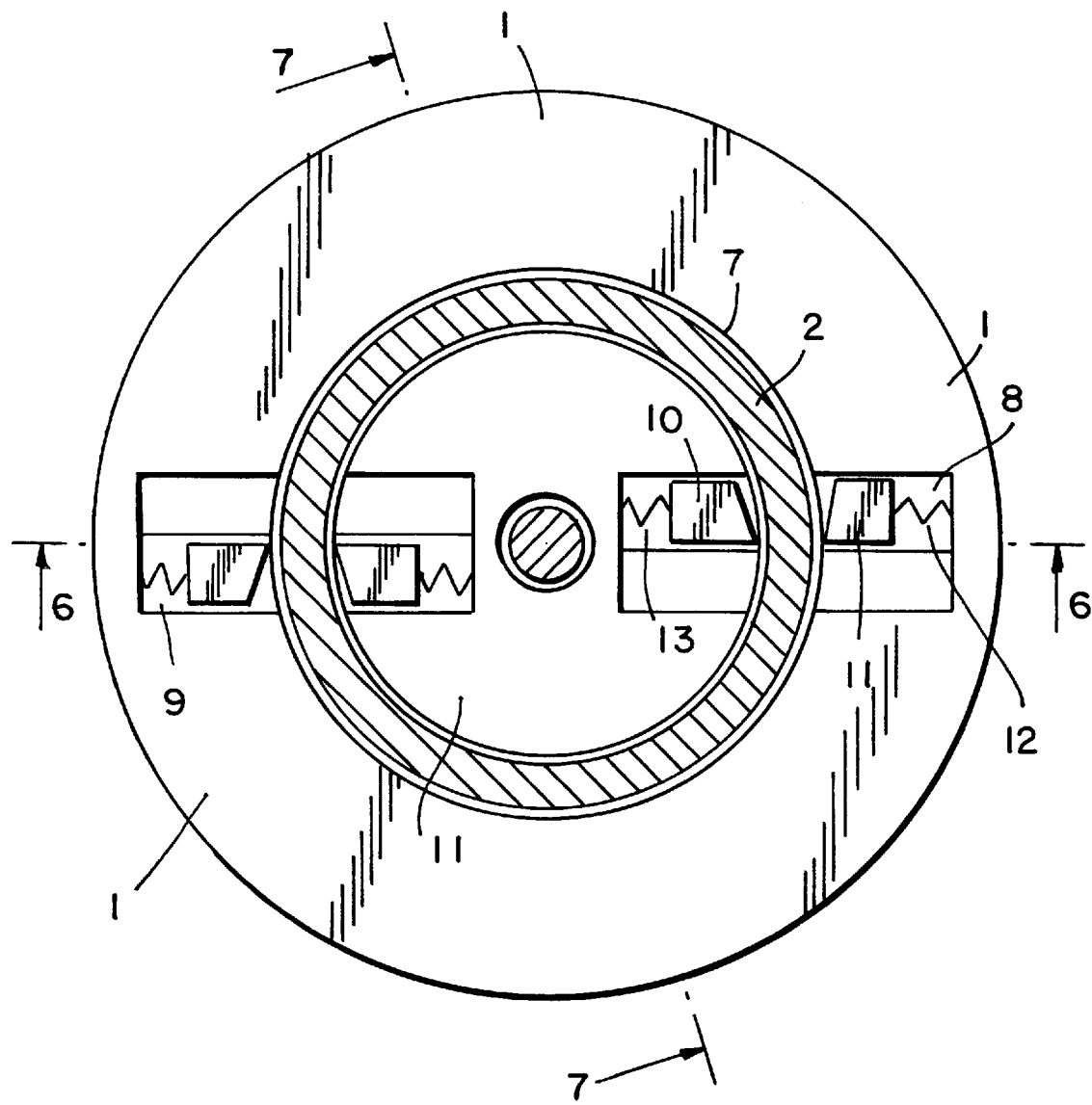
FIG. 5 shows a schematic illustration of the friction disk according to the invention.
Figure 6:
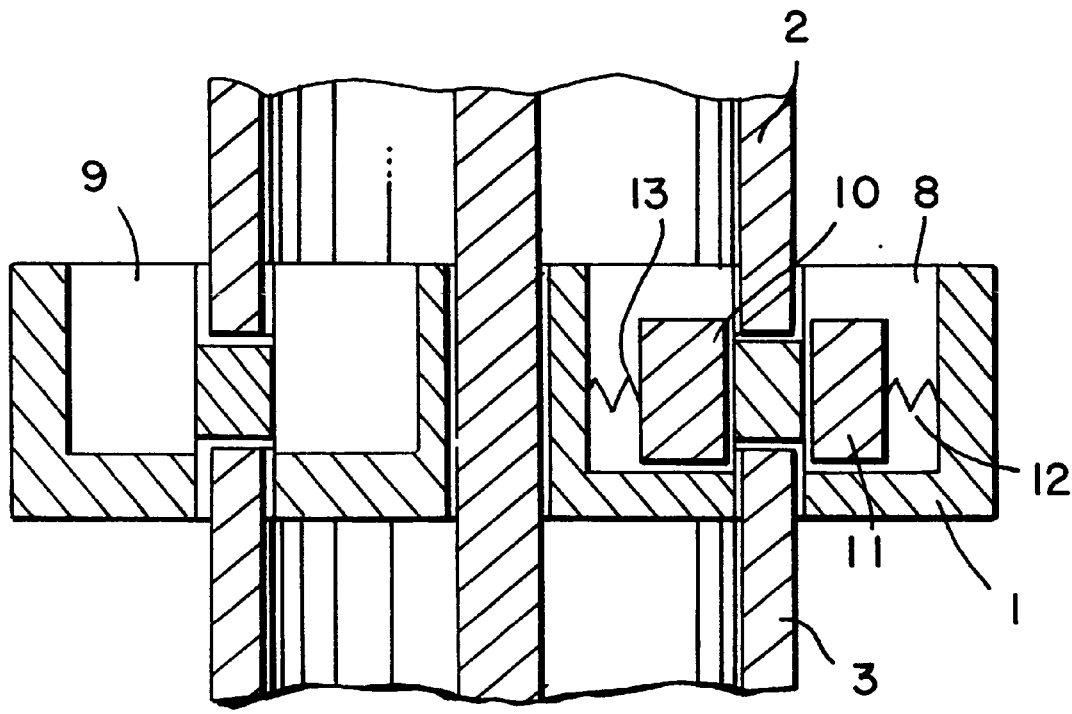
FIG. 6 shows the Section B—B from FIG. 5.
Figure 7:
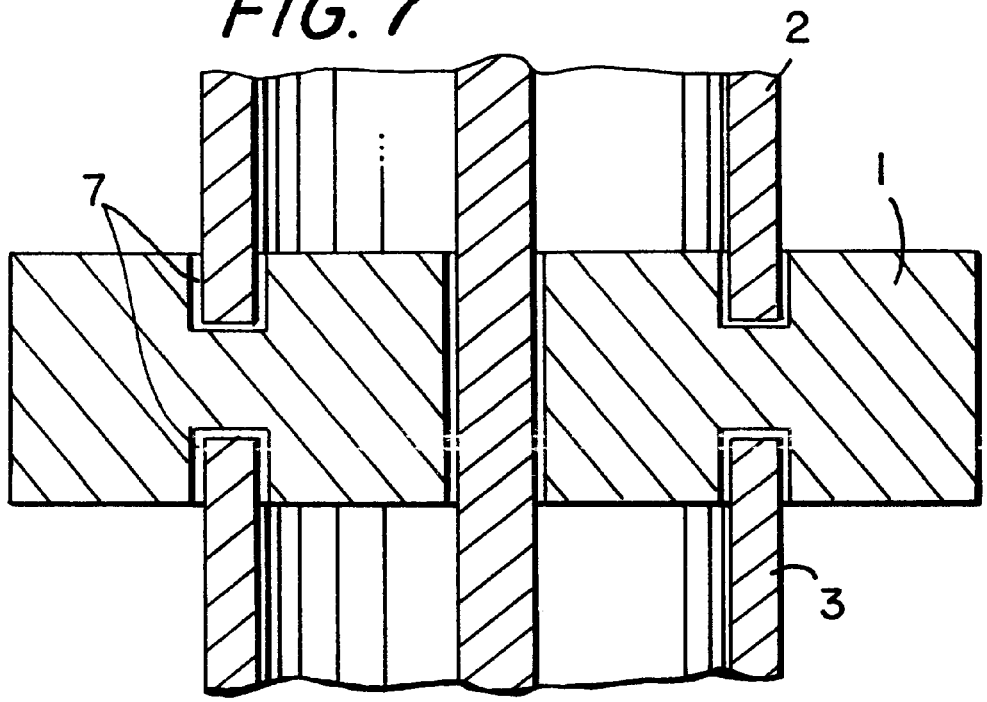
FIG. 7 shows the Section C—C from FIG. 5.

According to FIGS. 5 to 7, the friction burr that is produced during the friction process is continuously reshaped by the annular grooves 7 which are provided in the friction disk 1 or are produced during the friction process.

After completion of the friction and joining process, the friction and upsetting burr 5 is removed with the aid of the cutting tools 10 and 11, which are arranged in the cutouts 8 and 9 in the friction disk 1 and are prestressed by means of springs 12 and 13 in the radial direction, against the components 2 and 3 to be connected. The rotation energy that remains in the elements I and II once the friction disk 1 has been rubbed through is used, (until the elements I and II have been completely braked to rest) to remove the friction and upsetting burr 5.

What is claimed is:

1. A method of connecting components, including pipes, rods or semi-finished products by friction welding, comprising the steps of using a friction element which is arranged in an abutting position between those ends of the components which are to be connected and is rotated about an axis which is common to the components and to the friction element in order to produce a welding temperature by friction heat with compression forces which at the same time act on contact surfaces between the friction element and the component ends; subjecting the connecting component, for adjoining process, after reaching the welding temperature and stopping the rotary movement of the friction element applying higher oppositely directed pressure forces to the components; removing a burr produced during friction and joining process, after the rotary movement has been stopped to higher compression forces in opposite directions; after reaching the welding temperature and forming a virtually steady-state temperature area at the ends of the components, continuing the friction process until a material of the friction element is completely removed on surfaces which are involved with the friction process and the ends of the components to be joined come into contact with one another; thereafter subjecting the components to an increased contact pressure and welding to one another by upsetting; and reshaping and removing the burr during the friction and upsetting, at the same time.

2. A method as defined in claim 1, and further comprising using for control of the friction welding process a change of a torque of a friction element drive as a result of a complete displacement of the material of the friction element.

3. A method as defined in claim 1; and further comprising removing the plasticized friction and upsetting burr in a cooling-down phase of the components which have been connected to one another, with a rotation energy transmitted to the friction element being absorbed.

4. An apparatus for connecting components, including pipes, rods or semi-finished products by friction welding, comprising a friction element arrangeable in an abutting position between ends of the components which are to be connected and rotated about an axis which is common to the components and to the friction element, in order to produce a welding temperature by friction heat with compression forces which at the same time act on contact surfaces between the friction element and the ends of the components; means for subjecting the connecting components to higher compression forces in opposite directions after the rotary movement has been stopped for performing adjoining process; means for continuing the welding process after reaching the welding temperature within a virtually steady-state temperature area, with the material of the friction element being removed on the surfaces which are involved in the friction process until the ends of the components to be joined come into contact with one another; means for subjecting the components thereafter to an increased contact pressure to weld the components to one another by upsetting; and means for removing friction and upsetting burr produced during the friction and upsetting process, at the same time; said friction element being formed as a friction disk which is provided with said means for removing the friction and upsetting burr.

5. An apparatus as defined in claim 4, wherein said friction disk has cutouts in which cutting tools are arranged so that they can are movable radially.

6. A method as defined in claim 1; and further comprising using for control of the friction welding process a sudden change of a rotary speed of a friction element drive as a result of a complete displacement of the material of the friction element.

7. An apparatus as defined in claim 4, wherein said friction element is formed as a friction disk provided with means for removing of the friction and upsetting burr.

8. An apparatus as defined in claim 7, wherein said friction disk is provided with openings in which cutting tools are radially displaceable.

* * * * *